United States Patent
Nakamura

(10) Patent No.: US 10,762,400 B2
(45) Date of Patent: Sep. 1, 2020

(54) SYSTEM CONFIGURED TO OUTPUT IMAGE DATA REPRESENTING ADJOINING CHARACTERISTIC IMAGES

(71) Applicant: BROTHER KOGYO KABUSHIKI KAISHA, Nagoya, Aichi (JP)

(72) Inventor: Kenichi Nakamura, Anjo (JP)

(73) Assignee: BROTHER KOGYO KABUSHIKI KAISHA, Nagoya, Aichi (JP)

( * ) Notice: Subject to any disclaimer, the term of this patent is extended or adjusted under 35 U.S.C. 154(b) by 0 days.

(21) Appl. No.: 16/392,759

(22) Filed: Apr. 24, 2019

(65) Prior Publication Data

US 2019/0332905 A1    Oct. 31, 2019

(30) Foreign Application Priority Data

Apr. 27, 2018    (JP) ................... 2018-086013

(51) Int. Cl.
*G06F 3/12*         (2006.01)
*G06K 15/00*    (2006.01)
(Continued)

(52) U.S. Cl.
CPC ....... *G06K 15/1822* (2013.01); *G06F 3/1205* (2013.01); *G06F 3/1243* (2013.01);
(Continued)

(58) Field of Classification Search
CPC .......... G06K 15/1822; G06K 15/1848; G06K 15/022; G06F 3/1243; G06F 3/1205; G06F 3/1276; G06F 3/1285; G06F 3/1242
See application file for complete search history.

(56) References Cited

U.S. PATENT DOCUMENTS 6,236,752 B1 *    5/2001    Katayama .......... G06K 15/1848
                                                                    358/1.6
9,019,555 B1 *    4/2015    Chappell .............. G06K 15/024
                                                                    229/300
(Continued)

FOREIGN PATENT DOCUMENTS

JP        2016-099700 A        5/2016

*Primary Examiner* — Juan M Guillermety
(74) *Attorney, Agent, or Firm* — Scully, Scott, Murphy & Presser, P.C.

(57) ABSTRACT

A controller of an information processing apparatus is configured to receive image data representing a compound image including at least first characteristic data and second characteristic data, extract first and second characteristic image data respectively representing the first and second characteristic images, determine, by analyzing the first and second characteristic image data as extracted, whether the first and second characteristic images are identical. When it is determined that the first and second characteristic images are not identical, the controller generates arranged image data subjected to be printed and representing the first and second characteristic images in a boundary-distinguishable manner, while, when it is determined that the first and second characteristic images are identical, the controller generates arranged image data subjected to be printed and representing the first and second characteristic images not in a boundary-distinguishable manner. Then, the controller outputs the arranged image data.

11 Claims, 7 Drawing Sheets

(51) Int. Cl.
*H04N 1/00* (2006.01)
*G06K 15/02* (2006.01)

(52) U.S. Cl.
CPC ......... *G06F 3/1276* (2013.01); *G06K 15/022* (2013.01); *G06K 15/1848* (2013.01)

(56) References Cited

U.S. PATENT DOCUMENTS

2015/0169264 A1* 6/2015 Tawada ................. G06F 3/1285
358/1.2
2016/0247047 A1* 8/2016 Shirasaka ............ G06K 15/022

\* cited by examiner

| BARCODE IMAGE | NUMBER OF DETECTION |
|---|---|
| A | 4 |
| B | 5 |
| C | 2 |
| D | 4 |
| E | 4 |
| F | 5 |

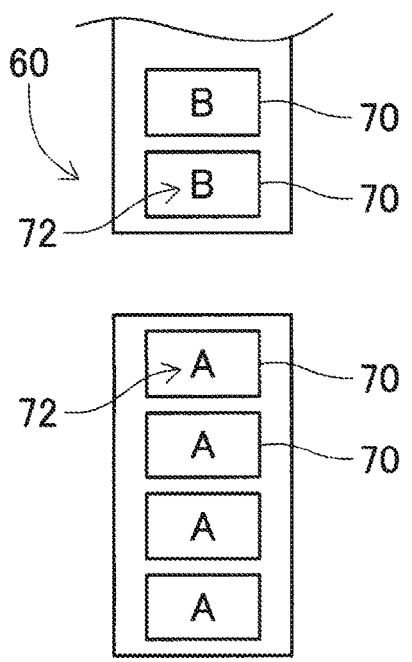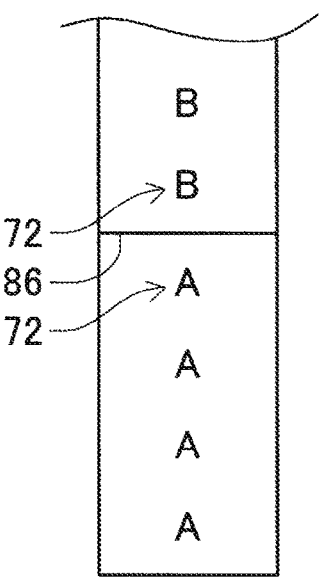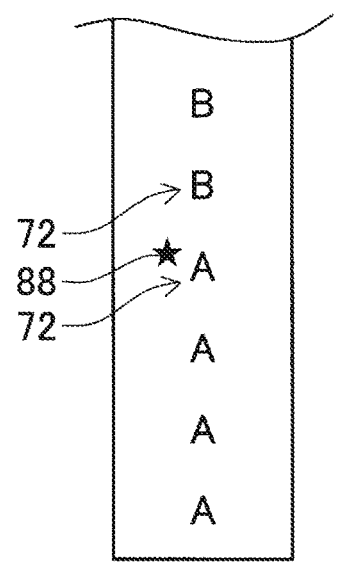
FIG. 10A   FIG. 10B   FIG. 10C
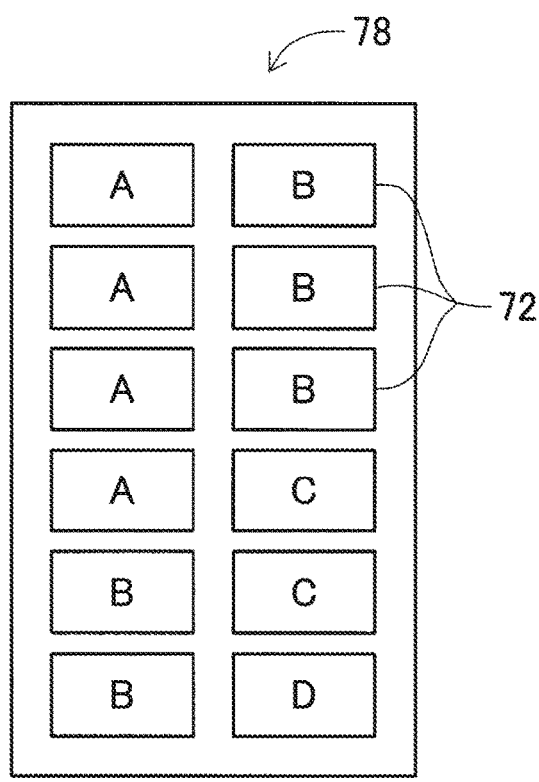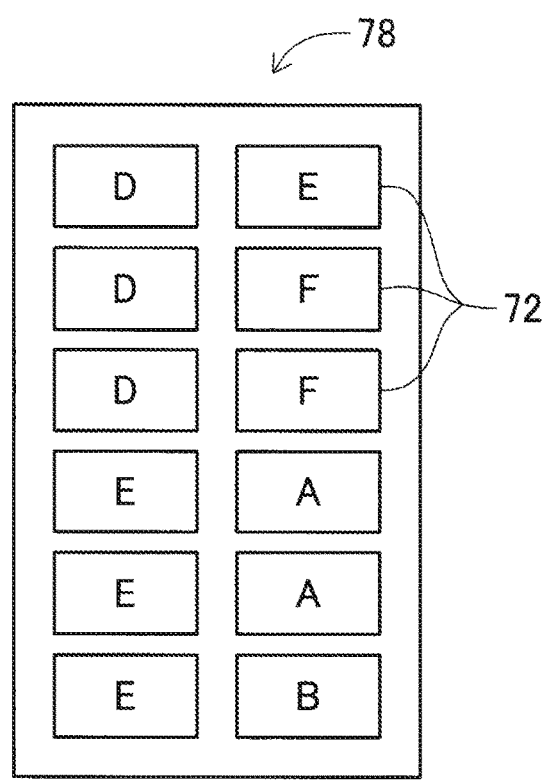
FIG. 11A   FIG. 11B

SYSTEM CONFIGURED TO OUTPUT IMAGE DATA REPRESENTING ADJOINING CHARACTERISTIC IMAGES

CROSS-REFERENCE TO RELATED APPLICATIONS

This application claims priority under 35 U.S.C. § 119 from Japanese Patent Application No. 2018-086013 filed on Apr. 27, 2018. The entire subject matter of the application is incorporated herein by reference.

BACKGROUND

Technical Field

The present disclosures relate to a printer configured to print characteristic images having particular characteristics on a printing sheet, an information processing system employing such a printer, and a non-transitory computer-readable recording medium containing instructions for such a printer.

Related Art

There has been known a printer configured to print characteristic images having particular characteristics (e.g., a barcode image containing barcodes) on a printing sheet.

SUMMARY

An improved method of printing such characteristic images has been desired.

According to aspects of the present disclosures, there is provided a non-transitory computer-readable recording medium for an information processing apparatus provided with a communication interface and a controller, the controller being configured to executable an application program configured to output image data representing a compound image including at least a first characteristic image and a second characteristic image each having a particular characteristic. The instructions cause, when executed, the controller to perform a receiving process of receiving the image data representing the compound image designated by the application program, an extracting process of extracting, from the image data representing the compound image received in the receiving process, first characteristic image data representing the first characteristic image and second characteristic image data representing the second characteristic image, a determining process of determining, by analyzing the first characteristic image data and the second characteristic image data extracted in the extracting process, whether the first characteristic image and the second characteristic image are identical. The instructions further causes the controller to perform a generating process in which, when it is determined in the determining process that the first characteristic image and the second characteristic image are not identical, the controller generates arranged image data subjected to be printed and representing the first characteristic image and the second characteristic image in a boundary-distinguishable manner, and when it is determined in the determining process that the first characteristic image and the second characteristic image are identical, the controller generates print data subjected to be printed and representing the first characteristic image and the second characteristic image not in a boundary-distinguishable manner, and an outputting process of transmitting the print data generated in the generating process and subjected to be printed by a printer.

According to aspects of the present disclosures, there is provided a printer provided with an input interface and a controller. The controller being configured to perform a receiving process of receiving image data representing a compound image including a plurality of characteristic images having particular characteristics through the input interface, an extracting process of extracting, from the image data representing the compound image received in the receiving process, first characteristic image data representing a first characteristic image and second characteristic image data representing a second characteristic image, a determining process of determining, by analyzing the first characteristic image data and the second characteristic image data extracted in the extracting process, and a generating process, whether the first characteristic image and the second characteristic image are identical. In the generating process, when it is determined in the determining process that the first characteristic image and the second characteristic image are not identical, the controller generates print data used to print the first characteristic image and the second characteristic image in a boundary-distinguishable manner, and when it is determined in the determining process that the first characteristic image and the second characteristic image are identical, the controller generates print data used to print the first characteristic image and the second characteristic image not in a boundary-distinguishable manner. Then, the controller serves as a print engine configured to print out the print data generated in the generating process.

According to aspects of the present disclosures, there is provided an information processing system including an information processing apparatus provided with a controller. The controller is configured to perform a receiving process of receiving the image data representing a compound image including a plurality of characteristic images having particular characteristics designated by an application program configured to output the image data, an extracting process of extracting, from the image data representing the compound image received in the receiving process, first characteristic image data representing the first characteristic image and second characteristic image data representing the second characteristic image, a determining process of determining, by analyzing the first characteristic image data and the second characteristic image data extracted in the extracting process, whether the first characteristic image and the second characteristic image are identical. The controller further perform a generating process in which, when it is determined in the determining process that the first characteristic image and the second characteristic image are not identical, the controller generates arranged image data data subjected to be printed and representing the first characteristic image and the second characteristic image in a boundary-distinguishable manner, and when it is determined in the determining process that the first characteristic image and the second characteristic image are identical, the controller generates the arranged image data subjected to be printed and representing the first characteristic image and the second characteristic image not in a boundary-distinguishable manner. Further, the controller performs an outputting process of outputting the arrange image data subjected to be printed by the printer.

BRIEF DESCRIPTION OF THE ACCOMPANYING DRAWINGS

FIGS. 10A-10C respectively show examples of characteristic images printed on printing sheets in a boundary-distinguishable manner.

FIGS. 11A and 11B show an example of the arrangement images for two pages, respectively, according to a modified embodiment.

DETAILED DESCRIPTION OF THE EMBODIMENTS

Configuration of Information Processing System

Figure 1:
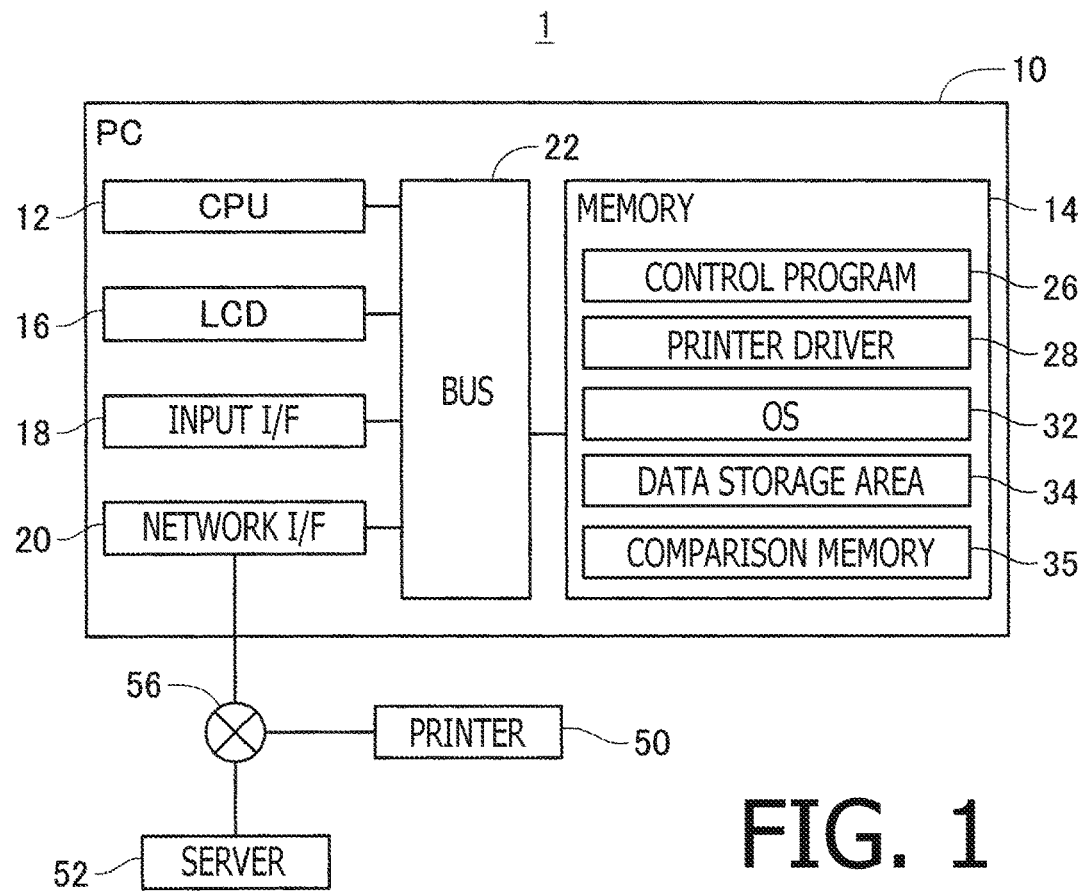
FIG. 1 is a block diagram of an information processing system according to an illustrative embodiment of the present disclosures.

FIG. 1 is a block diagram of an information processing system 1 according to an illustrative embodiment of the present disclosures. The information processing system 1 includes a PC (which is an example of an information processing apparatus) 10, a printer (which is an example of a printer) 50 and a sever 52.

The PC 10 is mainly provided with a CPU (which is an example of a controller) 12, a memory 14, an LCD 16, an input I/F 18, and a network I/F 20, which are communicatably interconnected with each other through a bus 22.

The PC 10 is communicatably connected to the printer 50 through the network I/F 20 and a network 56. A method of communication employed is, for example, a wired LAN, a USB, Wi-Fi® and/or Bluetooth®. The printer 50 is configured to print on a tape-like printing sheet (see FIG. 2A) 60. The printer 50 is configured to exchange various pieces of information and various instruction signals with the PC 10 and create labels on which user-desired texts and images are printed, under control by the PC 10. Further, the network I/F 20 is connected to the server 56 through the network 56. Thus, the PC 10 can exchange information with the server 52.

Figures 2A, 2B:
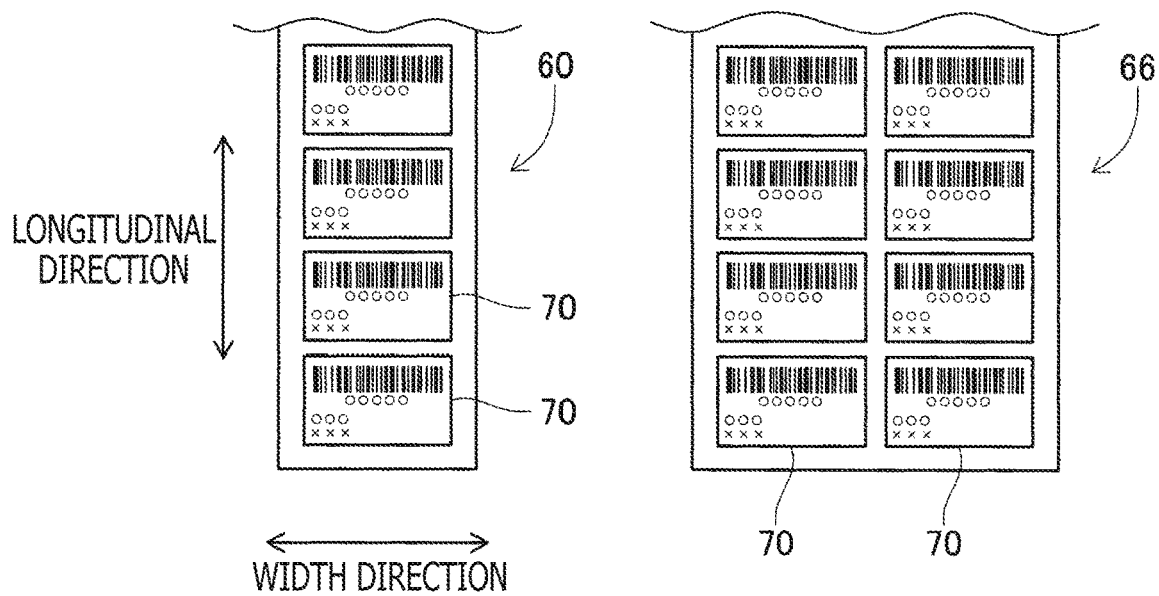
FIGS. 2A and 2B show examples of two different printing sheets.

The printer 50 is configured to perform printing on a tape-like printing sheet 60 as shown in FIG. 2A. The tape-like printing sheet 60 (hereinafter, simply referred to as the printing sheet 60) has a particular width, and includes commodity labels 70 which are aligned in a single row along a longitudinal direction (see FIG. 2A) which is perpendicular to a width direction of the printing tape 60. The printing sheet 60 is wound to be rolled and accommodated in the printer 50. When printing is performed, images are printed sequentially and respectively on the commodity labels 70. Further, according to the illustrative embodiment, the printer 50 is configured to cut out the printing sheet 60 at arbitrary positions so that each of the printed commodity labels 70 are cut out separately.

The CPU 12 of the PC 10 performs operations in accordance with a control program (which is an example of an application program) 26, a printer driver 28 and the OS 32. The control program 26 is for performing browsing, printing and the like of files having particular formats (e.g., PDF). An example of such a control program 26 is Adobe Reader®. The printer driver 28 is a device driver for the printer 50 and is configured to control operations of the printer 50. The OS 32 is a program which provides basic functions used by the control program 26 and the printer driver 28. It is noted that the CPU 12 which executes a program (e.g., the printer driver 28) will occasionally be referred to by the program name. For example, there will be a cased where an expression "the printer driver 28 performs a process" means "the CPU 12 executing a program (e.g., the printer driver 28) performs a process."

The memory 14 has a data storage area 34. The data storage area 34 is an area for storing data which is necessary when the control program 26 is executed. According to the illustrative embodiment, the memory 14 includes a RAM, a ROM, a flash memory, an HDD, a buffer provided to the CPU 12 and/or a combination thereof.

It is noted that the memory 14 may be a computer-readable storage medium. The computer-readable storage medium is a non-transitory medium. The non-transitory medium includes, in addition to the computer-readable storage medium above, a recording medium such as a CD-ROM, a DVD-ROM and the like. It is also noted that the non-transitory medium is a tangible medium. In contrast, an electrical signal carrying programs downloaded from a server on the Internet or the like is a computer-readable signal medium, which is one type of a computer-readable medium, is not included in the non-transitory computer-readable storage medium.

The LCD 16 is configured to display various pieces of information of the PC 10. It is noted that a display according to the illustrative embodiment need not be limited to an LCD, but could be another type of display such as an organic LE display or the like. The input I/F 18 an interface through which user operations are input and includes a keyboard, a mouse and the like. It should be noted that the input I/F 18 needs not be limited to the keyboard and the like. That is, the input I/F 18 may be a touch panel overlaid on a display screen of the LCD 16.

It is noted that, in the following description, processes of the CPU 12 in accordance with instructions scripted in programs are basically indicated. Processes indicated by terms "determine", "extract", "select", "calculate", "judge", "identify", "obtain", "receive", "control", and "set" are the processes of the CPU 12. It is noted that the processes executed by the CPU 12 include a hardware control through the OS 32. It is further noted that the term "obtain" will be used to mean a concept in which a request is not necessary. That is, a process in which the CPU 12 receive data without requesting for the same is included in a concept that the CPU 12 obtains the data. Further, a term "data" in the specification is represented by a computer-readable bit array. A plurality of pieces of data having substantially the same meaning/contents but different formats will be treated as the same data. A term "information" used in the specification will be treated in the same manner. Further, the processes of "instruct", "respond" and "request" are executed by communicating information/data indicating "instruct", "respond" and "request", respectively. Further, the process such as "setting" is executed by storing the input setting information in the memory.

With the above-described configuration, the information processing system 1 is capable of printing the commodity labels used in a service provided by a service-providing company.

Figure 3:
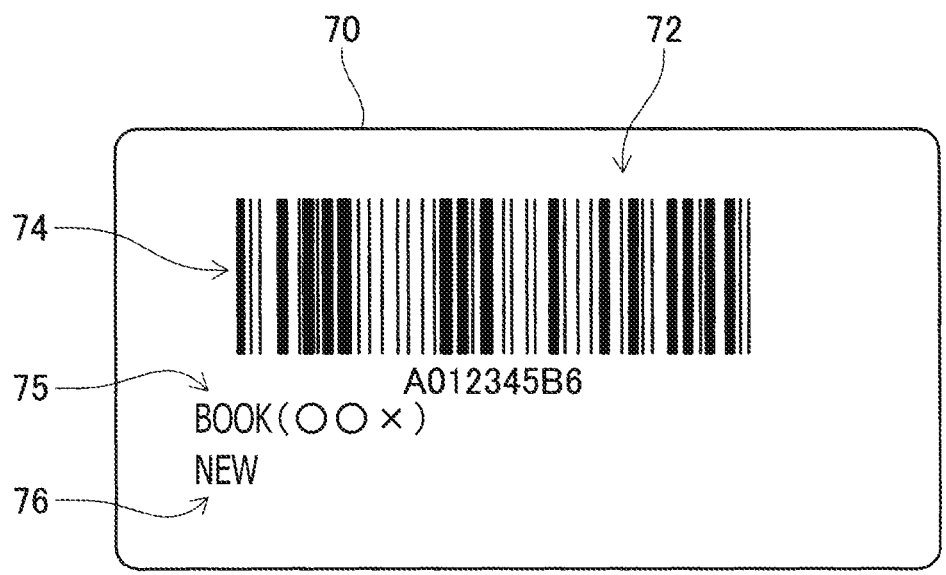
FIG. 3 shows an example of a barcode image to be printed on the printing sheets.

According to the illustrative embodiment, the server 52 is a server operated by the service-providing company. The PC 10 operated by the user accesses the server 52 to obtain image data representing an image to be printed on commodity labels 70. As shown in FIG. 3, the image (hereinafter, referred to as a barcode image; which is an example of a characteristic image) 72 to be printed on the commodity label 70 includes a barcode 74 to identify an item, an item name 76 indicating the name of the item to be exhibited, and condition of the item. The user is required to attach the item label to each of exhibition object items. Accordingly, it is necessary for the user to obtain image data representing a barcode corresponding to each of the exhibition object items (hereinafter, such image data being referred to as barcode image data). That is, when the number of the exhibition object items is ten, the user needs to obtain ten pieces of barcode image data respectively representing the ten exhibition object items from the server 52. For example, when the user utilizes FULFILLMENT by AMAZON®, the user obtains barcode image data to be used from the server of a company which provides such a service.

The user obtains image data of the commodity labels 70 corresponding to the number of commodities subject to selling, namely barcode image data representing barcode images corresponding to the number of commodities subject to selling from the server 52. The barcode image data obtained from the server 52 is PDF data. According to an example described below, the PC 10 obtains the barcode image data representing 24 barcode images for four commodities A, five commodities B, two commodities C, four commodities D, four commodities E and five commodities F from the server 52.

Figure 4A:
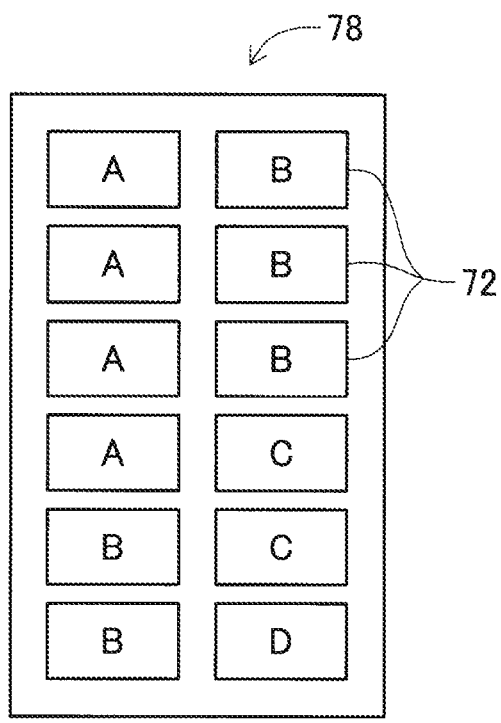
FIGS. 4A and 4B show an example of arrangement images for two pages, respectively.
Figure 4B:
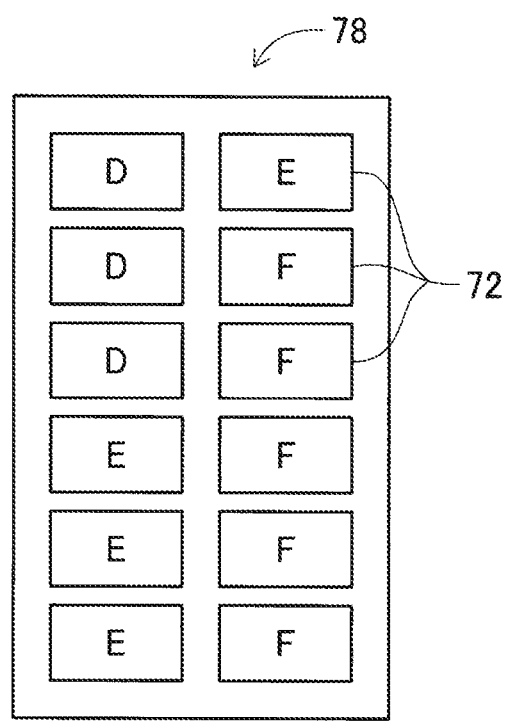

As shown in FIGS. 4A and 4B, the server 52 is configured to generate the PDF data representing arrangement images 78 corresponding to respective pages of a printing sheet and each containing 12 barcode images 72 arranged in two lines by six rows (hereinafter, an arrangement in M lines by N rows will be referred to as an M-by-N arrangement). The barcode images 72 contained in the arrangement image 78 are examples of compound images. That is, the server 52 generates image data of the arrangement images 78 each containing 12 barcode images 72. According to the above-mentioned example, since 24 barcode images are required, the server 52 generates the image data of the arrangement images 78 for two pages. FIG. 4A schematically shows the arrangement image 78 for the first page and FIG. 4B schematically shows the arrangement image 78 for the second page. It is noted that indications of "A"-"F" in FIGS. 4A and 4B indicate barcode images 72 for the commodities A-F. That is, the arrangement image 78 for the first page (see FIG. 4A) includes the barcode images 72 for four commodities A, five commodities B, two commodities C and one commodity D, while the arrangement image 78 for the second page (see FIG. 4B) includes the barcode images 72 for three commodities D, four commodities E and five commodities F.

Figure 5:
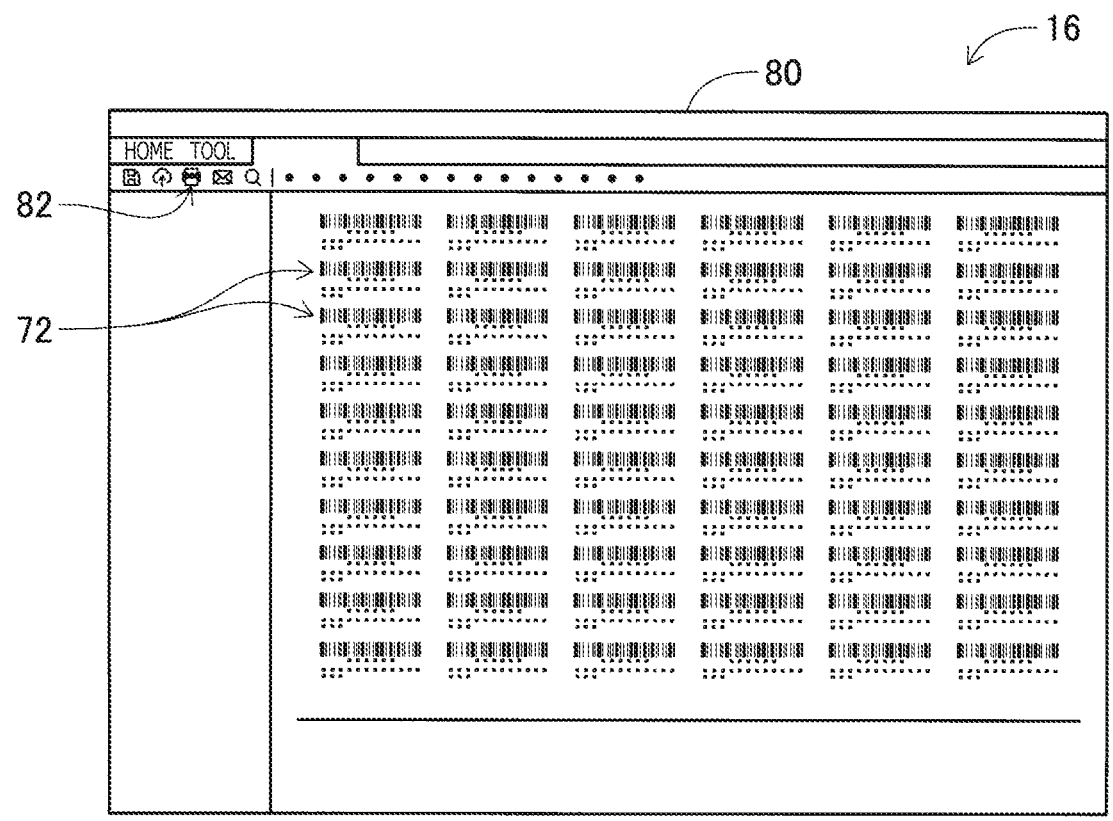
FIG. 5 is an example of a barcode image display screen.

Further, the control program 26 is an application program configured to display the PDF image data. Based on the PDF image data obtained from the server 52, the control program 26 displays a barcode image display screen 80 as shown in FIG. 5 on the LCD 16. On the barcode image display screen 80, the plurality of barcode images 72 included in the arrangement image obtained from the server 52 are displayed. When a print button 82 is operated on the barcode image display screen 80, the control program 26 outputs the image data obtained from the server 52, or the image data of the arrangement images for two pages to the printer driver 28. When receiving the image data, the printer driver 28 generates image data for printing the images based on the received image data, that is, the printing image data for printing the barcodes 72 included in the arrangement images 78 on the printing sheet.

Specifically, when the print button 82 is operated, the control program 26 outputs a print command to the printer driver 82 through the OS 32. At this time, image data which has been converted, based on the PDF image data, into vector-formatted image data which can be interpreted by the printer driver 28 is transmitted to the printer driver 28 together with the print command. It is noted that the image data output by the control program 26 is vector-format image data corresponding to the arrangement image 78 the control program 26 received from the server 52. That is, the vector-format image data representing pages each having barcode images 72 arranged in 2-by-6 as shown in FIGS. 4A and 4B are transmitted to the printer driver 28. When the 24 barcode images 72 are to be printed as in the above-described example, the control program 26 outputs the vector-format image data for two pages of arrangement images to the printer driver 28. It should be noted that the format of the image data transmitted to the printer driver 28 need not be limited to the vector-format image data, but image data of any other format (e.g., raster-format image data) may be transmitted to the printer driver 28.

Next, a process executed by the printer driver 28 when receiving the image data and the print command output from the control program 26 will be described referring to FIGS. 6-8. When the printer driver 28 receives the print command and the image data from the control program 26 (S100), the printer driver 28 requests the OS 32 to convert the vector-format image data, which is received together with the print command, to bitmap-format image data (S102). When the OS 32 receives the request from the printer driver 28, the OS 32 converts the vector-format image data to the bitmap-format image data and transmits the converted image data to the printer driver 28. Then, the printer driver 28 receives the bitmap-format image data as converted from the OS 32 (S104). That is, the printer driver 28 receives, from the OS 32, the bitmap-format image data representing two pages of arrangement images 78 each including barcode images 72 arranged in 2-by-6 arrangement. When the printer driver 28 is configured to convert the vector-format image data to image data having another format from which the printer driver 28 can extract the barcode images 72, the vector-format image need not be converted into the bitmap-format image. When a format of the image data received in S100 is the format enabling the printer driver 28 to extract the barcode images 72 without conversion, S102-S104 may be omitted.

Next, the printer driver 28 resets a comparison memory 35 which is configured to store memory image data (described later) and the counter configured to count the number of detections of the barcode image data which is the same as the memory image data stored in the comparison memory 35 (S106). Then, the printer driver 28 performs an image extraction process of extracting the image data of the barcode images 72 from the image data received from the OS 32, that is, the image data of the arrangement image 78 including the barcode images 72 arranged in 2-by-6 on a page basis (S108).

For example, the printer driver 28 may analyze the image data of the arrangement image 78 (see FIG. 4A) for the first page to detect characteristic data having a characteristic feature as the image data indicative of the barcode. Then, position information indicating a position of an image represented by the detected characteristic data is obtained as position information indicating the position of the barcode 74 included in the barcode image 72. Next, the printer driver 28 calculates an offset amount of the barcode 74 with respect to a coordinate at a particular corner of an image based on the bitmap-format image data. It is noted that dimensions of width and height of the barcode image 72 have been input to the printer driver 28 in advance. Therefore, based on the offset amount of the barcode 74 and the width and height of the barcode image 72, an area to extract the barcode image 72 (hereinafter, referred to as a crop area) is identified on the image based on the bitmap-format image data. Then, the printer driver 28 extracts the image data within the crop area from the bitmap-format image data. As above, the image data of the barcode image 72 is extracted.

When a plurality of pieces of characteristic data are detected, the printer driver 28 extracts a plurality of pieces of image data of a plurality of barcode images 72 corresponding to the plurality of pieces of detected characteristic data, respectively. That is, the printer driver 28 extracts the image data of 12 barcode images 72 from the first page of the arrangement image 78. In this case, the printer driver 28 sequentially extracts the barcode images 72 from a top of the arrangement image 78, that is, from an upper left barcode image 72 of the arrangement image 78 (i.e., the barcode image 72 for commodity A in FIG. 4A) to an end of the arrangement image 78, that is, to a lower right barcode image 72 of the arrangement image 78 (i.e., the barcode image 72 for commodity D in FIG. 4A). According to the illustrative embodiment, in extraction of the barcode image 72, the line is prioritized than the row. That is, the barcode images 72 arranged in a left line (which is a first line) on the arrangement image 78 are extracted sequentially from an uppermost one to a lowermost one, and then the barcode images 72 arranged in a right line (which is a second line) on the arrangement image 78 are extracted sequentially from an uppermost one to a lowermost one. Then, the printer driver 28 determines whether continuously extracted two barcode images 72 are the same in the order of extraction and counts the number of the continuously extracted same barcode images 72.

The above process will be described referring to the flowchart shown in FIG. 6-8. When the image data of the barcode image 72 is extracted from the first page of the arrangement image 78, the printer driver 78 determines whether the comparison memory 35 is in a rest state (S110). At a time immediately after extraction of the image data of the barcode image 72 is extracted from the first page of the arrangement image 78, the comparison memory 35 reset in S106 stays in the reset state. In the following description, the image data of the barcode image 72 extracted from the arrangement image 78 will be referred to as extracted image data. When it is determined that the comparison memory 35 is in the reset state (S110: YES), the printer driver 28 stores the extracted image data firstly extracted from the first page of the arrangement image 78, that is, the extracted image data of the barcode image 72 of the commodity A in the comparison memory 35 (S112). Then, the printer driver 28 set the counter to one (1) in S114.

Next, the printer driver 28 determines whether there exists unprocessed extracted image data (S116). At this time, when only the first piece of the extracted image data has been processed from among a plurality of pieces of extracted image data which are extracted from the first page of the arrangement image 78, it is determined that there exists unprocessed extracted image data (S116: YES). Next, the printer driver 28 determines whether the secondly extracted piece of the extracted image data is the same as the image data stored in the comparison memory 35 (hereinafter, referred to as memory image data) in S118.

For determining whether two pieces of image data (i.e., the extracted image data and the memory image data) are identical or not, various methods may be used. For example, histograms of the extracted image data and the memory image data are obtained, and it is determined that the extracted image data and the memory image data are identical when the two histograms are approximate to each other by a certain degree or more. Alternatively, text data is obtained by decoding the barcode included in each of the extracted image data and the memory image data, and it is determined that the extracted image data and the memory image data are identical when the texted data obtained from the extracted image data and the text data obtained from the memory image data are identical.

The extracted image data secondly extracted from the first page of the arrangement image 78 is the image data of the barcode image 72 of the commodity A. Since the memory image data is the image data of the barcode image 72 of the commodity A stored in S112, it is determined that the extracted image data is the same as the memory image data (S118: YES). Then, the printer driver 28 counts up the value of the counter (S120), that is, the value of the counter is incremented by one.

Next, the printer driver 28 determines again whether there remains unprocessed extracted image data (S116). At this stage, since only the second extracted image data has been processed from among the extracted image data extracted from the first page of the arrangement image 78, it is determined that there remains unprocessed extracted image data (S116: YES). Then, the process in S118 onwards is repeated. Since both the third extracted image data and fourth extracted image data represent the image data of the barcode image 72 of the commodity A, it is determined that the extracted image data is the same as the memory image data (S118: YES), and the value of the counter is counted up (S120). Thus, when the fourth extracted image data has been processed, the value of the counter is set to four.

After the fourth extracted image data has been processed, it is determined whether there remains unprocessed extracted image data (S116). Since the fifth and onwards extracted image data have not been processed, it is determined that there remains unprocessed extracted image data (S116: YES). In S118, the printer driver 28 determines whether the fifth extracted image data is the same as the memory image data. In this case, the fifth extracted image data is the image data of the barcode image 72 of the commodity B, while memory image data is the image data of the barcode image 72 of the commodity A. Therefore, it is determined that the fifth extracted image data is not identical to the memory image data (S118: NO).

In this case, the printer driver 28 registers the image data stored in the comparison memory 35 and the value of the counter with map data in an associated manner (S122). It is noted that the image data stored in the comparison memory 35 is registered as the barcode image and the value of the counter is registered as a detected number. In the above-described example, the image data of the barcode image 72 of the commodity A is stored in the comparison memory 35 and the value of the counter is four, the image data of the barcode image 72 of the commodity A and the detected number "4" are associated with each other as shown in FIG. 9. It is noted that FIG. 9 conceptually shows the map data.

Next, the printer driver 28 stores the extracted image data in the comparison memory 35 (S112). That is, the fifth extracted image data, which is the image data of the barcode image 72 of the commodity B, in the comparison memory 35. Then, the counter is reset to one (S114). Next, it is determined that there remains unprocessed extracted image data (S116: YES), and the process in S118 onwards is performed. The above process is repeated. Since each of the sixth-ninth extracted image data is the image data of the barcode image 72 of the commodity B, it is determined that each of the sixth-ninth extracted image data is identical to the memory image data (S118: YES) and the value of the counter is counted up (S120). When the ninth extracted image data has been processed, the value of the counter is set to five.

After the ninth extracted image data has been processed, it is determined that there remains unprocessed extracted image data (S116: YES). In S118, the printer driver 28 determines whether the tenth extracted image data is the same as the memory image data. In this case, the tenth extracted image data is the image data of the barcode image 72 of the commodity C, while memory image data is the image data of the barcode image 72 of the commodity B. Therefore, it is determined that the tenth extracted image data is not identical to the memory image data (S118: NO).

In this case, the printer driver 28 registers the image data stored in the comparison memory 35 and the value of the counter with map data in an associated manner (S122). That is, the image data of the barcode image 72 of the commodity B and the detected number "5" are registered with the map data in an associated manner (see FIG. 9).

Next, the printer driver 28 stored the extracted image data in the comparison memory 35 (S112). That is, in S112, the printer driver 28 stores the image data of the barcode image 72 of the commodity C, which is the tenth extracted image data, in the comparison memory 35. Then, the value of the counter is set to one (S114). Next, it is determined that there remains unprocessed extracted image data (S116: YES), and the process in S118 onwards is performed. Since the eleventh extracted image data is the image data of the barcode image 72 of the commodity C, it is determined that the extracted image data is identical to the memory image data (S118: YES), and the value of the counter is counted up (S120). As above, when processing of the eleventh extracted image data has been completed, the value of the counter is set to two.

After completion of processing of the eleventh extracted image data, it is determined that there remains unprocessed extracted image data (S116: YES). Then, the printer driver 28 determines whether twelfth extracted image data (i.e., the last extracted image data of the first page) is identical to the memory image data. At this stage, the twelfth extracted image data is the image data of the barcode image 72 of the commodity D, while memory image data is the image data of the barcode image 72 of the commodity C. Therefore, the printer driver 28 determines that the twelfth extracted image data is not identical to the memory image data (S118: NO).

Then, the printer driver 28 registers the image data stored in the comparison memory 35 and the value of the counter with the map data (S122). That is, as shown in FIG. 9, the printer drive 28 registers the image data of the barcode image 72 of the commodity C and the detected number "2" with the map data in an associated manner. At this stage, the map data includes the image data of the barcode image 72 of the commodity A and the detected number "4", the image data of the barcode image 72 of the commodity B and the detected number "5" and the image data of the barcode image 72 of the commodity C and the detected number "2" have been registered, but the image data of the barcode image 72 of the commodity D and the detected number thereof have not been registered.

Next, the printer driver 28 stores the twelfth extracted image data, which is the image data of the barcode 72 of the commodity D, in the comparison memory 35 (S112) and sets the value of the counter to one (S114). Then, all the 12 pieces of the extracted image data extracted from the first page of the arrangement image 78 have been processed. Accordingly, in S116, it is determined that there remain no unprocessed extracted image data (S116: NO).

Next, the printer driver 28 determines whether there remains an unprocessed page in the document (S124). According to the current example, the printer driver 28 has received the image data including two pages of arrangement images 78 as one document. According to the above-described process, the image data of the first page of arrangement image 78 has been processed but that of the second page of arrangement image 78 has not been processed. Therefore, it is determined that the remains an unprocessed page in the document (S124: YES).

Next, the printer driver 28 generates printing image data (image data for printing) of the barcode images 72 registered with the map data for the first page of arrangement image 78 in the order of registration with the map data. Specifically, the printer driver 28 determines whether printing image data of all the barcode images 72 registered with the map data have been generated (S126). At this stage, since the printer driver 28 has not generated the printing image data of the barcode images 72 registered with the map data, it is determined that printing image data of all the barcode images 72 registered with the map data has not been generated (S126: NO).

Next, the printer driver 28 generates the printing image data of the barcode image 72 of the commodity A, which is firstly registered with the map data (regarding the first page of arrangement image 78), in S128. It is noted that the number of detections associated with the barcode image 72 of the commodity A is four (see FIG. 9). Accordingly, the printer driver 28 generates four pieces of printing image data of the barcode image 72 of the commodity A so that the barcode images 72 of the commodity A can be printed on four continuous commodity labels 70 of the printing sheet 60, respectively. Further, the printer driver 28 add a cutting command to the thus generated printing image data. The cutting command is a command to cut out the printing sheet 60 after the printing process based on the printing image data has been completed. In the above-described case, the cutting command indicates to cut out the printing sheet 60, after the barcode image 72 of the commodity A is printed on each of the four commodity labels 70, at a position between the fourth commodity label 70 and the fifth commodity label 70. Then, the printer driver 28 transmits the printing image data with the cutting command being added to the printer 50 (S130).

Next, the printer driver 28 determines whether the printing image data of all the barcode images 72 registered with the map data have been generated. At this stage, since only the printing image data for the barcode image 72 of the commodity A has been generated, it is determined that all the barcode images 72 registered with the map data have not been generated (S126: NO). Therefore, the printer driver 28 generates the printing image data of the barcode image 72 of the commodity B, which is data secondly registered with the map data (S128). In this case, the number of detections associated with the barcode image 72 of the commodity B is five (see FIG. 9), the printer driver 28 generates five pieces of the printing image data of the barcode image 72 for the commodity B. Further, the printer driver 28 adds the cutting command to the thus generated printing image data. Then, the printer driver 28 transmits the printing image data to which the cutting command has been added to the printer 50 (S130).

The printer driver 28 performs the same process (S126-S130) repeatedly to generate the printing image data for the barcode image 72 of two commodities B and add the cutting command to the generated printing image data. Then, the printer driver 28 transmits the printing image data with the cutting command added to the printer 50. Thus, the printing image data for all the barcode images 72 registered with the map data, regarding the first page of arrangement image 78, have been generated and transmitted to the printer 50.

As above, the printer driver 28 adds the cutting command to the printing image data and transmits the same to the printer 50. Accordingly, a user of the printer 50 can obtain the commodity labels 70 in a state where a portion of the printing sheet 60 where the commodity labels 70 on which the barcode images 72 of the commodity A are printed is cut out from a portion of the printing sheet 60 where the commodity labels 70 on which the barcode images 72 of the commodity B are printed as shown in FIG. 10A. Accordingly, a workability of the user is improved. It is noted that a state where the two portions are separated by cutting is an example of a state where the two portions are boundary-distinguishable (i.e., a boundary between the two portions are distinguishable). That is, the portion of the printing sheet 60 where the commodity labels 70 on which the barcode images 72 of the commodity A are printed and the portion of the printing sheet 60 where the commodity labels 70 on which the barcode images 72 of the commodity B are printed in a boundary-distinguishable manner.

When the printing image data of all the barcode images of the first page of the arrangement image 78 registered with the map data has been transmitted to the printer 50 (S126: YES), the printer driver 28 extracts the image data of the barcode images 72 from the second page of arrangement image 78 (see FIG. 4B) (S108). Then, with respect to the extracted image data of the second page of arrangement image 78, the process performed with respect to the extracted image data of the first page of arrangement image 78 described above (S110-S116) is performed.

Concretely, for example, the printer driver 28 determines whether the extracted image data which was firstly extracted from the second page of arrangement image 78 (i.e., the image data of the barcode image 72 of the commodity D) is identical to the memory image data (S118). At this stage, the image data of the barcode image 72 of the commodity D has been stored in the comparison memory 35 as the memory image data when the first page of arrangement image 78 was processed. Accordingly, it is determined that the extracted image data is identical to the memory image data (S118: YES). Then, the value of the counter is incremented by one (S120) so that the value of the counter becomes two. That is, the barcode image 72 at the end of the first page of the arrangement image 78 and the barcode image 72 at the top of the second page of the arrangement image 78 are treated as continuous images, and the value of the counter is incremented so that they are the same images.

When a process the same as the process performed on the extracted image data of the first page of the arrangement image 78 (S110-S116) is performed on the extracted image data of the second page of the arrangement image 78, the image data of the barcode image 72 of the commodity D and the number of detections thereof and the image data of the barcode image 72 of the commodity E and the number of detections thereof are registered with the map data as a result of the processes performed on the second page of the arrangement image 78. However, the image data of the barcode image 72 of the commodity F, which is detected in eighth-twelfth detections and the number of detections thereof have not been registered with the map data. It is because the process is configured such that the memory image data is registered with the map data when the extracted image data is not identical to the memory image data (S118: NO). That is, unless the image data of the barcode image 72 which is different from the commodity F is extracted after the barcode image 72 of the commodity F (extracted in eighth-twelfth extractions), the image data of the barcode image 72 of the commodity F cannot be the memory image data. Therefore, according to the above-described configuration, the image data of the barcode image 72 of the commodity F and the number of detections thereof are not registered with the map data.

Taking the above in consideration, after all the barcode images 72 of the second page of the arrangement image 78 have been extracted (S116: NO) and it is determined that there remains no unprocessed image of the document (S124: NO), the printer driver 28 registers the image data of the barcode image 72 of the commodity F extracted in eighth-twelfth detections and the number of detections thereof with the map data (S132).

Thereafter, the printer driver 28 generate the printing image data of the barcode images 72 registered with the map data of the second page of the arrangement image 78 in the order of registration with the map data. Specifically, the printer driver 28 determines whether the barcode image 72 subject to generation of the printing image data is the barcode image 72 lastly registered with the map data (S134). At this stage, the image currently subject to generation of the printing image data is the barcode image of the second page of the arrangement image 78 firstly registered with the map data, it is determined that the barcode image 72 subject to generation of the printing image data is not the barcode image 72 lastly registered with the map data (S134: NO).

Next, the printer driver 28 generates the printing image data of the barcode image 72 of the commodity D which is firstly registered with the map data among the barcode images 72 of the second page of the arrangement image 78 (S136). In this case, the number of detections associated with the barcode image of the commodity D is four (see FIG. 9), the printer driver 28 generates the printing image data for four barcode images 72 of the commodity D. Further, the printer driver 28 adds the cutting command to the generated printing image data. Then, the printer driver 28 transmits the printing image data to which the cutting command is added to the printer 50 (S138).

Next, the printer driver 28 determines whether the barcode image 72 subject to generation of the printing image data is the barcode image 72 lastly registered with the map data. Since the next barcode image 72 subject to generation of the printing image data is the barcode image 72 of the commodity E, it is determined that the barcode image 72 subject to generation of the printing image data is not the barcode image 72 lastly registered with the map data (S134: NO). Then, the printer driver 28 generates the printing image data of the barcode image 72 of the commodity E (S136). At this stage, since the number of detections associated with the barcode image 72 of the commodity E is four (see FIG. 9), the printer driver 28 generates the printing image data of four barcode images 72 of the commodity E. Further, the printer driver 28 adds the cutting command to the generated printing image data. Thereafter, the printer driver 28 transmits the printing image data to which the cutting command is added to the printer 50 (S138).

Further, the printer driver 28 determines whether the barcode image 72 subject to generation of the printing image data is the barcode image 72 lastly registered with the map data. Since the next barcode image 72 subject to generation of the printing image data is the barcode image 72 of the commodity F, it is determined that the barcode image 72 subject to generation of the printing image data is the barcode image 72 lastly registered with the map data (S134: YES). Then, the printer driver 28 generates the printing image data of the barcode 72 of the commodity F (S136). Since the number of detections associated with the barcode image 72 of the commodity F is five (see FIG. 0), the printer driver 28 generates the printing image data of the five barcode images 72 of the commodity F. Further, the printer driver 28 adds the cutting command to the generated printing image data. Thereafter, the printer driver 28 transmits the printing image data to which the cutting command is added to the printer 50 (S138). With the above processes, the printing image data of all the barcode images 72 of the second page of the arrangement image 78 is generated, which is transmitted to the printer 50.

As described above, the last barcode image 72 (i.e., the barcode image 72 of the commodity D) of the first page of the arrangement image 78 and the first barcode image 72 (i.e., the barcode image 72 of the commodity D) of the second page of the arrangement image 78 are treated as continuous images and recorded by the counter as the same images. Accordingly, it becomes possible to collect the barcode images 72 at the end of the first page of the arrangement image 78 and the barcode images 72 at the top of the second page of the arrangement image 78 and print four barcode images 72 on four commodity labels 70, respectively. Further, the four commodity labels 70 can be cut out of the printing sheet.

It is noted that the process of S100 performed by the CPU 12 is an example of a receiving process. A process in S108 performed by the CPU 12 is an example of an extracting process. The process in S128, S136 and S140 performed by the CPU 12 is an example of a generating process. Further, the process in S130, S138 and S142 performed by the CPU 12 is an example of a transmitting process.

According to the above-described embodiment, the following effects can be achieved.

When the extracted image data is identical to the memory image data, it is determined that the continuous two barcode images are the same images and indicate the same commodity. Accordingly, the printing image data is generated such that the two continuous barcode images are not boundary-distinguishable (i.e., the two continuous barcode images are not boundary-distinguishable). On the other hand, when the extracted image data is not identical to the memory image data, it is determined that the two pieces of image data respectively representing the two continuous barcode images 72 do not indicate the same commodity, the printing image data is generated such that a boundary is made between the two continuous barcode images 72 (i.e., the two continuous barcode images are formed in a boundary-distinguishable manner). Accordingly, it becomes easy to differentiate the two continuous barcode images 72 respectively representing different commodities, and workability of the user is improved.

According to the illustrative embodiment, the mode in which the two continuous barcode images 72 are formed in a boundary-distinguishable manner is a mode in which the printing sheet 60 is cut at a position between the two continuous barcodes 72 printed on the commodity labels 70. According to this configuration, the printing sheet 60 is divided by the barcode images 72 of each commodity. Therefore, workability of the user is improved very much.

The printer driver 28 extracts the barcode images 72 from each of the arrangement images 78 from the top to the end in order, and determines whether the continuously extracted two barcode images 72 are identical or not. When it is determined that the continuously extracted two barcode images 72 are the same, the printer driver 28 generates the printing image data used to perform printing on the commodity labels 70 which are arranged in a line on the printing sheet 60 in a mode where the two barcode images 72 are not formed in a boundary-distinguishable manner. When it is determined that the continuously extracted two barcode images 72 are not the same, the printer driver 28 generates the printing image data used to perform printing on the commodity labels 70 which are arranged in a line on the printing sheet 60 in a mode where the two barcode images 72 are formed in a boundary-distinguishable manner. Accordingly, boundaries are appropriately provided at every different commodity.

When the barcode image 72 at the end of the first page of the arrangement image 78 and the barcode image 72 at the top of the second page of the arrangement image 78 are identical, the printer driver 28 generates the printing image data used to perform printing on the printing sheet 60 in a mode where the two barcode images 72 are not formed in a boundary-distinguishable manner. Accordingly, boundaries are appropriately provided at every different commodity. When the barcode image 72 at the end of the first page of the arrangement image 78 and the barcode image 72 at the top of the second page of the arrangement image 78 are not identical, the printer driver 28 generates the printing image data used to perform printing on the printing sheet 60 in a mode where the two barcode images 72 are formed in a boundary-distinguishable manner. According to this configuration, even if the barcode images 72 of the same commodity exist for a plurality of pages, the barcode images 72 of the same commodity can be printed without any boundaries among the barcode images 72.

When it is determined whether the extracted image data and the memory image data are identical, barcodes respectively included in the extracted image data and the memory image data are decoded and text data is generated. Then, when the text data included in the extracted image data and the text data included in the memory image are identical, it is determined that the extracted image data and the memory image data are identical. According to this configuration, whether the extracted image data and the memory image data are identical or not can appropriately be determined.

When it is determined whether the extracted image data and the memory image data are identical or not, the histogram of each of the extracted image data and the memory image data. When the histogram of the extract image data and the histogram of the memory image data are close to each other in a particular degree or more, it is determined that the extracted image data and the memory image data are identical. With this configuration, whether the extracted image data and the memory image data are identical or not can be determined appropriately.

It is noted that aspects of the present disclosures need not be limited to the configuration of the illustrative embodiment described above. The configuration described above can be modified in various ways based on knowledge of person skilled in the art without departing from aspects of the present disclosures. Concretely, for example, according to the above-described illustrative embodiment, extraction of the barcode images 72 from the arrangement image 78, generation of the printing image data are performed on a page basis. However, extraction of the barcode images 72 from the arrangement image 78 and generation of the printing image data may be performed on a document basis. That is, generation of the printing image data may be performed after extraction of the barcode images 72 from both the first page and the second page of the arrangement image 78. Concretely, the printer may omit S126-S130 and proceeds to S108 after a positive determination in S124 (i.e., S124: YES). As described above, when extraction of the barcode images 72 from the arrangement image 78 and generation of the printing image data are performed on a document basis, even when the barcode images 72 of the same commodity (e.g., the barcode images 72 of the commodity A) are arranged randomly within the first page of the arrangement image 78 and the second page of the arrangement image 78 as shown in FIGS. 11A and 11B, it is possible to print all the barcode images 72 of the commodity A without providing any boundaries (i.e., not in a boundary-distinguishable manner). When extraction of the barcode images 72 from the arrangement image 78 and generation of the printing image data are performed on a page basis, a time period from receipt of the print command (S100) to start of printing by the printer 50 can be shortened.

According to the illustrative embodiment, the printing sheet 60 including a plurality of commodity labels 70 is used as the printing sheet used by the printer 50. However, the printing sheet 60 is only an example and any other printing sheet, for example, a non-fixed-length sheet may be employed. The non-fixed-length sheet is a tape-type printing sheet (e.g., a receipt sheet) which is cut out at an arbitrary position. When such a non-fixed-length sheet is used, the boundary provided to two images may be an image of a boundary line 86 as shown in FIG. 10B. Concretely, the printer driver 28 may generate printing image data in which the boundary line 86 is inserted after the last barcode image 72 of the commodity A in S128 and S136. With such a boundary line 86, the user can easily distinguish the barcode images 72 of the commodity A from the barcode images 72 of the commodity B. Further, as shown in FIG. 10C, as a mode where two images are formed in a boundary-distinguishable manner, a particular mark 88 may be added to one of the two images to be differentiated. Concretely, the printer driver 28 may generate the printing image data in which, for example, a particular mark is added to the last barcode image 72 of the commodity A, while no mark is added to the top barcode image 72 of the commodity B in S128 and S136. Alternatively, the printer driver 28 may generate the printing image data in which, for example, no mark is added to the last barcode image 72 of the commodity A, while a particular mark is added to the top barcode image 72 of the commodity B in S128 and S136. According to such a configuration, the user can easily distinguish the barcode images 72 of the commodity A from the barcode images 72 of the commodity B. The above configuration may be modified such that two different marks may be added to the two images to be differentiated, respectively.

According to the illustrative embodiment, the printing sheet 60 on which the commodity labels 60 are aligned in a line (see FIG. 2A) is employed as the printing sheet employed in the printer 50. However, the printing sheet 60 need not be limited to the sheet shown in FIG. 2A. For example, a printing sheet 66 on which the commodity labels 70 are aligned in two lines (see FIG. 2B) may be employed alternatively. In this case, when the number of detections of the barcode images 72 is an even number, the printing sheet 66 is cut out such that the commodity labels 70 on rows of which number is half the number of detections are separated. For further example, when the number of detections is six, the printing sheet 66 is cut out so that three rows of the commodity labels 70 are separated. When the number of detections is an odd number, the printing sheet 66 is cut out such that the commodity labels 70 on rows of which number is half the number of detections plus one are separated. For further example, when the number of detections is seven, the printing sheet 66 is cut out so that four rows of the commodity labels 70 are separated. In this case, no image is printed on one commodity label 70 of the cutout portion.

In the above-described illustrative embodiment, features according to aspects of the present disclosures are applied to the PC 10. However, the features could be applied to the printer 50. That is, a program having functions similar to those of the printer drive 28 may be provided to the printer 50. In such a case, the printer-side program may process the image data input to the printer 50 similarly to the printer driver 28 to generates the print data and make a print engine provided to the printer 50 perform printing.

Figure 6:
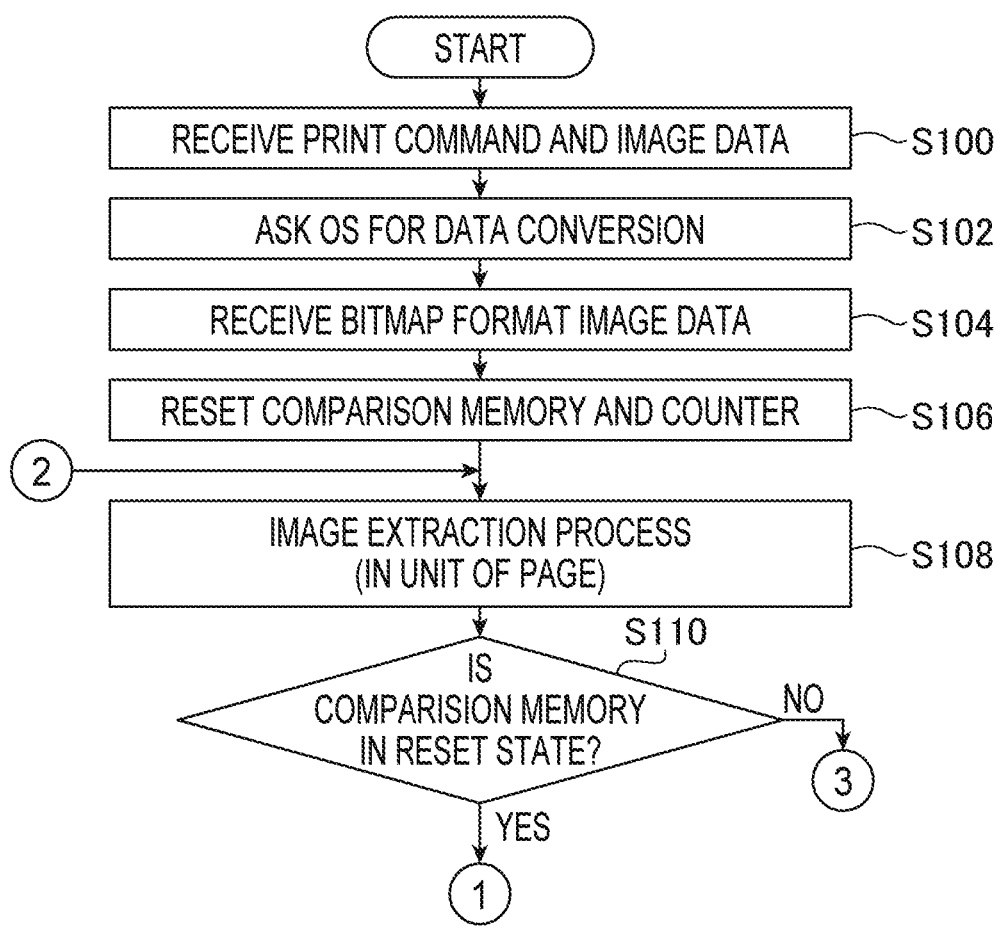
FIGS. 6-8 show a flowchart illustrating processing of a printer driver.
Figure 7:
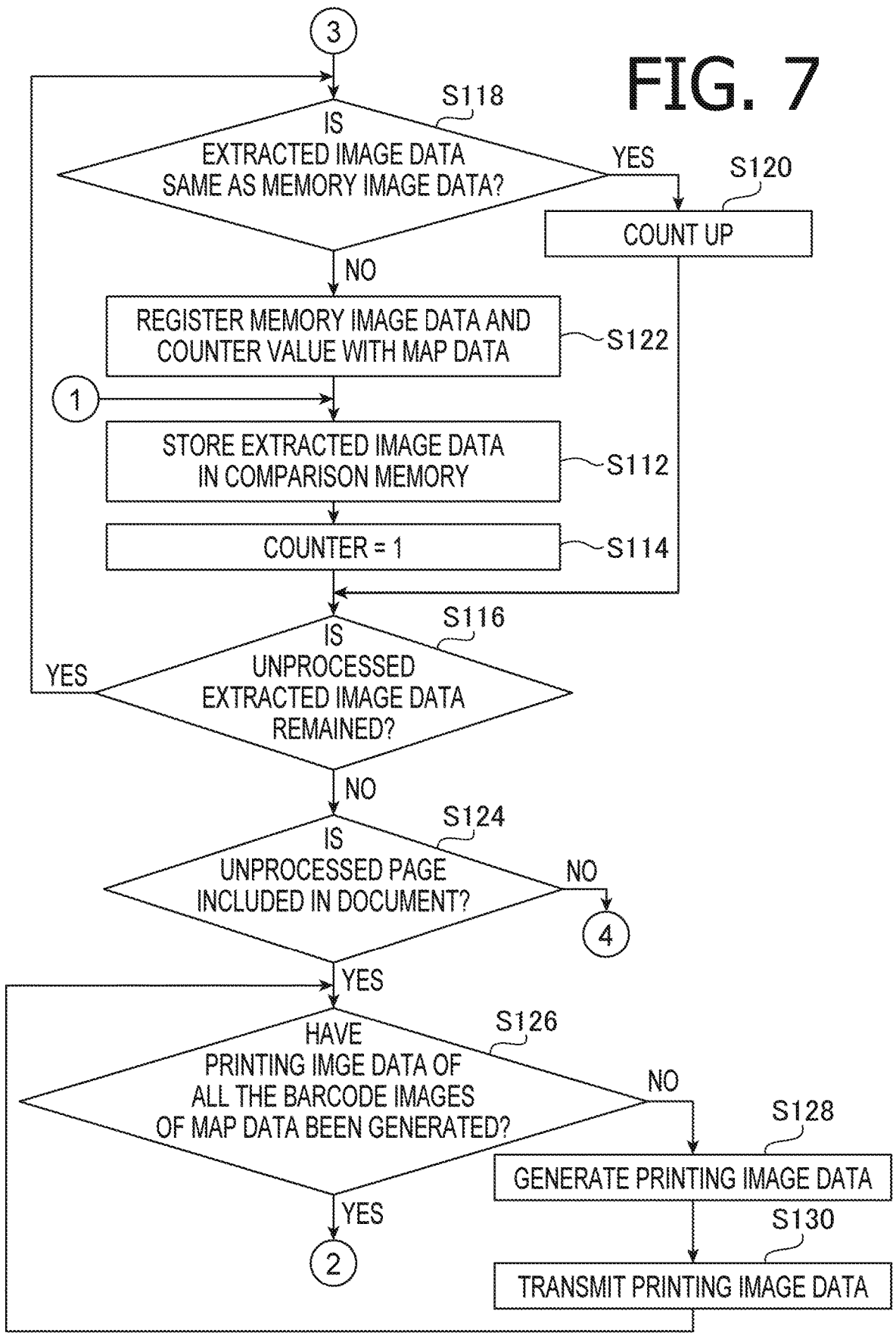
Figures 8, 9:
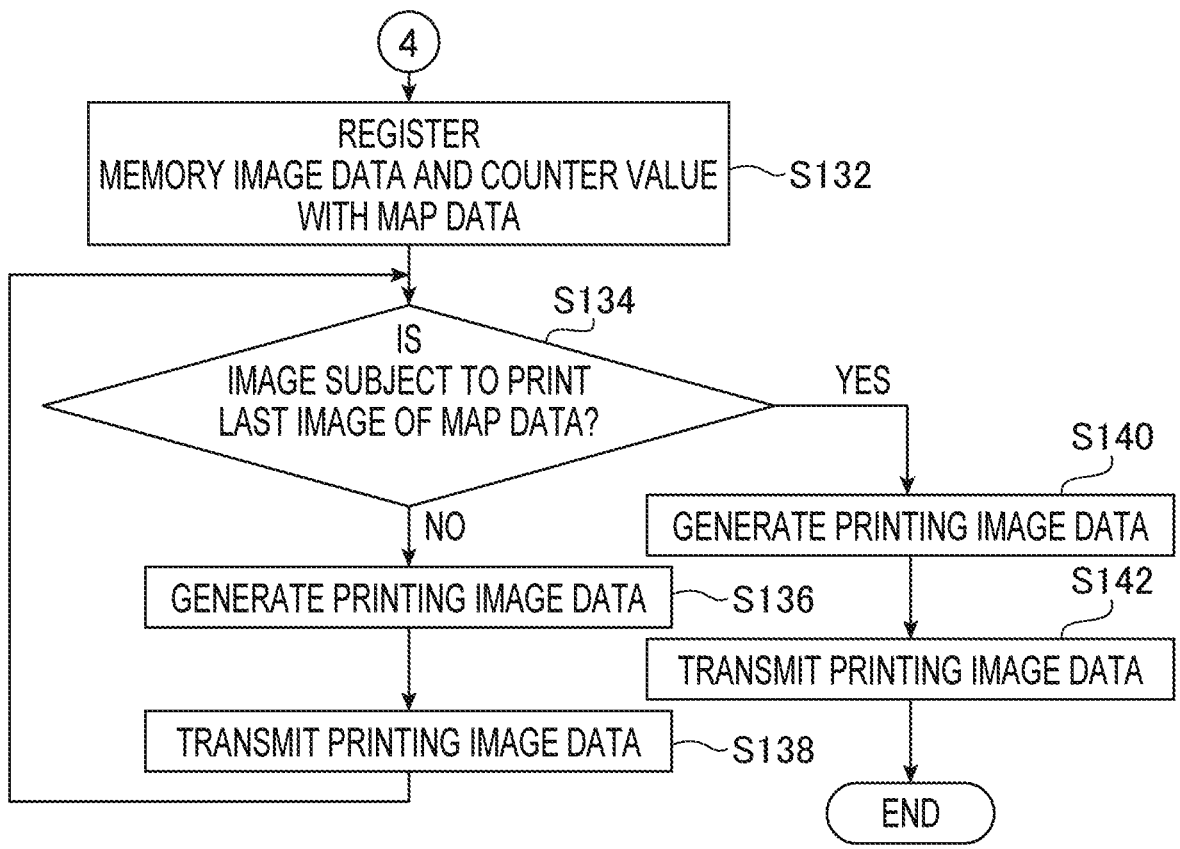
FIG. 9 is an example of map data.

According to the above-described embodiment, the process shown in FIGS. 6-8 is performed by the CPU 12. It is noted that the process may be performed by ASIC or other logical integrated circuits, or by a combination of the CPU, the ASIC and/or the logical integrated circuits.

It is noted that there has also been known an OS which does not make use of a printer driver. The present disclosure is also applicable to an information processing system and information processing device which of which OS does not make use of a printer driver (known as a driverless printing function), and a non-transitory computer-readable recording medium containing instructions therefor.

What is claimed is:

1. Non-transitory computer-readable recording medium for an information processing apparatus and a controller,
the instructions cause, when executed, the controller to perform:
a receiving process of receiving a print instruction of image data;
after the print instruction is received in the receiving process, an extracting process of analyzing the image data and extracting, from the image data, a plurality of pieces of characteristic image data, the image data representing a first image in which a plurality of characteristic images are arranged in a first arranging mode, each of the plurality of characteristic images indicating information by at least one of a text and a code image, the plurality of pieces of characteristic image data representing the characteristic images arranged at different positions in the first image represented by the image data;
a determining process of determining what information is indicated by each of the characteristic images respectively represented by the plurality of pieces of characteristic image data;
a generating process:
of generating print data representing a second image in which the characteristic images respectively represented by the plurality of pieces of characteristic image data extracted in the extracting process are arranged in a second arranging mode, the print data being data instructing a printer to print the characteristic images such that:

two adjoining characteristic images representing different pieces of information can be printed, by the printer, in a bounded manner; and two adjoining characteristic images representing the same information can be printed, by the printer, in a non-bounded manner;

and an outputting process of outputting the image data generated in the generating process so as to be printed by the printer.

2. The non-transitory computer-readable recording medium according to claim 1, wherein, in the generating process:

when it is determined in the determining process that the plurality of characteristic images are not identical, the controller generate the print data with including a cutting command indicating the printing sheet is to be cut between the plurality of characteristic images, wherein the printer is configured to print a plurality of images on a printing sheet and cut the printing sheet between any of two continuous images of the plurality of images; and when it is determined in the determining process that the plurality of characteristic images are identical, the controller generate the print data which does not include the cutting command.

3. The non-transitory computer-readable recording medium according to claim 1, wherein, in the generating process:

when it is determined in the determining process that the plurality of characteristic images are not identical, the controller generate the print data with including a delimiting image between the plurality of characteristic image; and when it is determined in the determining process that the plurality of characteristic images are identical, the controller generate print data without including the delimiting image between the plurality of characteristic images.

4. The non-transitory computer-readable recording medium according to claim 1, wherein, in the generating process:

when it is determined in the determining process that the plurality of characteristic images are not identical, the controller generate the print data with adding a particular mark image to one of the plurality of characteristic images; and when it is determined in the determining process that the plurality of characteristic images are identical, the controller generate the print data without adding a particular mark image to any of the plurality of characteristic images.

5. The non-transitory computer-readable recording medium according to claim 1, wherein the printer is configured to print two or more particular images in a manner arranged in a line, wherein the controller is configured to output the image data on a page basis, wherein, in the extracting process, the controller extracts the plurality of pieces of characteristic image data from a top to an end, in order, of the image data, wherein, in the determining process, the controller determines whether the plurality of pieces of characteristic image data are identical with regarding two pieces of continuously extracted image data being regarding as the plurality of pieces of characteristic image data, and wherein, in the generating process, the controller generates the print data such that the print data represents the plurality of characteristic images extracted in the extracting process in order along a line, two continuously arranged characteristic images of the plurality of characteristic images determined not to be identical in the determining process being printed so as to be bounded, two continuously arranged characteristic images of the plurality of characteristic images determined to be identical in the determining process being printed so as not to be non-bounded.

6. The non-transitory computer-readable recording medium according to claim 5, wherein, in the extracting process, when the controller receives the image data of a plurality of pages, the controller extracts the plurality of pieces of characteristic image data from the image data, on a page basis, from an ascending order of pages and from the top to the end of each page, wherein, in the determining process, the controller further determines whether the plurality of characteristic images are identical with regarding a characteristic image of the plurality of characteristic images at the end of an arbitrary page of the plurality of pages as a first characteristic image and regarding a characteristic image of the plurality of characteristic images at the top of a next to the arbitrary page of the plurality of pages as a second characteristic image, and wherein the print data represents the plurality of characteristic images extracted from the plurality of pages arranged in a line such that the characteristic image at the end of the arbitrary page of the plurality of pages and the characteristic image at the top of the next to the arbitrary page of the plurality of pages are aligned continuously, the characteristic image at the end of the arbitrary page of the plurality of pages and the characteristic image at the top of the next to the arbitrary page of the plurality of pages being printed such that:

when it is determined that the characteristic image at the end of the arbitrary page of the plurality of pages and the characteristic image at the top of the next to the arbitrary page of the plurality of pages are not identical, the two characteristic images are printed in the bounded manner; and when it is determined that the characteristic image at the end of the arbitrary page of the plurality of pages and the characteristic image at the top of the next to the arbitrary page of the plurality of pages are identical, the two characteristic images are printed in the non-bounded manner.

7. The non-transitory computer-readable recording medium according to claim 1, wherein, in the extracting process, the controller extracts, from the image data received in the receiving process, two pieces of image data representing images including barcodes as the plurality of characteristic image data, respectively.

8. The non-transitory computer-readable recording medium according to claim 7, wherein, in the determining process, the controller determines whether the plurality of characteristic images are identical based on whether a value indicated by the barcode included in a first of the two pieces of image data and a value indicated by the barcode included in a second of the two pieces of image data are identical.

9. The non-transitory computer-readable recording medium according to claim 1, wherein, in the determining process, the controller determines whether the plurality of characteristic images are identical by comparing the plurality of pieces of characteristic image data.

10. A printer comprising:
an input interface; and
a controller,
the controller being configured to perform:
a receiving process of receiving a print instruction of image data;
after the print instruction is received in the receiving process, an extracting process of analyzing the image data and extracting, from the image data, a plurality of pieces of characteristic image data the image data representing a first image in which a plurality of characteristic images are arranged in a first arranging mode, each of the plurality of characteristic images indicating information by at least one of a text and a code image, the plurality of pieces of characteristic image data representing the characteristic images arranged at different positions in the first image represented by the image data;
a determining process of determining what information is indicated by each of the characteristic images respectively represented by the plurality of pieces of characteristic image data;
a generating process:
  of generating print data representing a second image in which the characteristic images respectively represented by the plurality of pieces of characteristic image data extracted in the extracting process are arranged in a second arranging mode, the print data being data instructing a printer to print the characteristic images such that:
  two adjoining characteristic images representing different pieces of information can be printed, by the printer, in a bounded manner; and
  two adjoining characteristic images representing the same information can be printed, by the printer, in a non-bounded manner;
and
a print engine configured to print out the image data generated in the generating process.

11. An information processing system including an information processing apparatus provided with a controller,
the controller being configured to perform:
a receiving process of receiving a print instruction of image data;
after the print instruction is received in the receiving process, an extracting process of analyzing the image data and extracting, from the image data, a plurality of pieces of characteristic image data the image data representing a first image in which a plurality of characteristic images are arranged in a first arranging mode, each of the plurality of characteristic images indicating information by at least one of a text and a code image, the plurality of pieces of characteristic image data representing the characteristic images arranged at different positions in the first image represented by the image data;
a determining process of determining what information is indicated by each of the characteristic images respectively represented by the plurality of pieces of characteristic image data;
a generating process:
  of generating print data representing a second image in which the characteristic images respectively represented by the plurality of pieces of characteristic image data extracted in the extracting process are arranged in a second arranging mode, the print data being data instructing a printer to print the characteristic images such that:
  two adjoining characteristic images representing different pieces of information can be printed, by the printer, in a bounded manner; and
  two adjoining characteristic images representing the same information can be printed, by the printer, in a non-bounded manner;
and
an outputting process of outputting the image data generated in the generating process so as to be printed by the printer.

* * * * *